UNITED STATES PATENT OFFICE.

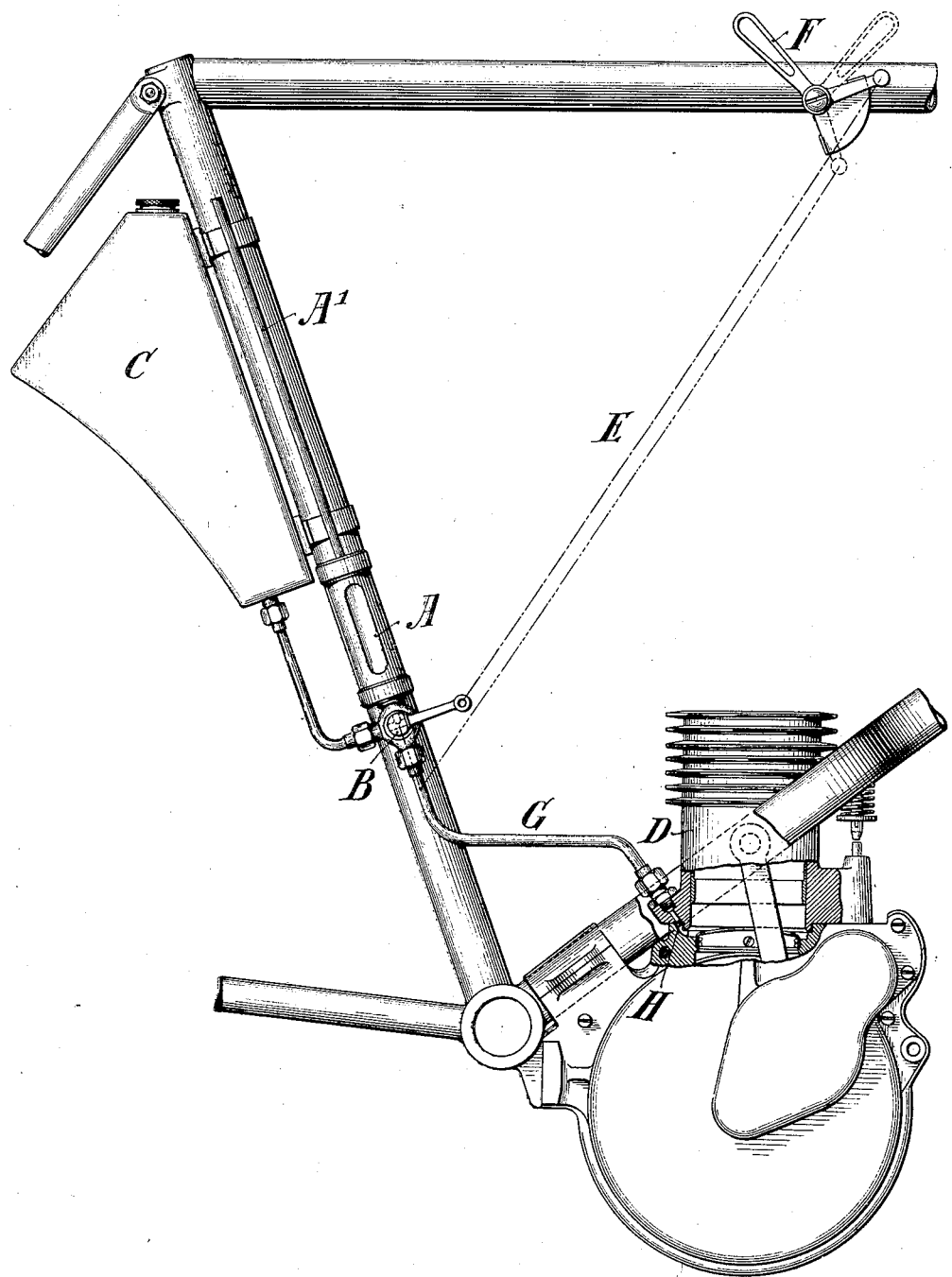

HENRI FRENAY, OF LÜTTICH, BELGIUM.

LUBRICATING APPARATUS.

No. 845,074.      Specification of Letters Patent.      Patented Feb. 26, 1907.

Application filed August 1, 1904. Serial No. 219,001.

*To all whom it may concern:*

Be it known that I, HENRI FRENAY, a subject of the King of Belgium, residing at Lüttich, Belgium, have invented certain new and useful Improvements in Lubricating Apparatus, of which the following is a specification.

The arrangement forming the subject of the present invention aims to provide a lubricating apparatus especially applicable to the motors of motor-cycles, and has for its object to convey by the operation of a simple lever-handle the lubricating-oil to a convenient part of the cylinder when the ordinary automatic lubrication by projection is no longer sufficient, consequent, for example, on a reduction of speed of the motor, due to an augmentation of exterior resistance. This arrangement comprises a lubricator A, provided with an air-tube A' and a three-way cock B, connected on one side to a charged oil-reservoir C and on the other side to the lower part of the cylinder D. The cock of the lubricator A is controlled by means of a connecting-rod E, operated by a lever-handle F, placed within reach of the driver's hand.

The operation is effected as follows: When the lever of the cock B is in the position represented by full lines in the drawing, it places the oil-reservoir C in communication with the lubricator A, which then fills. If the pace of the motor slackens, by reason of a supplementary resistance—for example, when one has to climb a rather long hill—the projections of oil obtained by the fly-wheel become insufficient to insure the lubrication of the piston. It suffices in this case to place the lever-handle F, controlling the cock B, in the position indicated by the dotted lines on the drawing. The plug of the cock B in the position which it then occupies cuts off the communication between the oil-reservoir C and the lubricator A, while it establishes it between the latter and the motor. The oil contained in the lubricator A is then conveyed by means of a tube G of convenient section into a circular channel H, into which the lower edge of the piston is immersed at each downward stroke. When this supplementary lubrication is no longer necessary, the lever-handle F is replaced in its original position, the lubricator A is refilled, and is ready to be utilized at the opportune moment.

What I claim as my invention, and desire to secure by patent, is—

1. In combination with a motor, a lubricating apparatus especially applicable to motor-cycles, and including a lubricator A, an oil-reservoir C, a three-way cock, and a controlling-handle therefor placed within reach of the driver, the cock being arranged to admit oil alternately either from the reservoir to the lubricator, or from the lubricator to the motor, and the lubricator A carrying an atmospheric tube A' allowing the flow of oil to the motor.

2. A lubricating apparatus especially applicable to motor-cycles, including in combination a lubricator, an air-tube on said lubricator, a three-way cock at the lower end of the lubricator, an oil-reservoir, a pipe connecting the lubricator with said oil-reservoir, a pipe connecting the three-way cock to the motor, and means for operating the three-way cock placed within reach of the driver's hand.

In witness whereof I have hereunto signed my name in the presence of two subscribing witnesses.

HENRI FRENAY.

Witnesses:
     BRUNO CLARUS,
     J. GROSS.